US009459922B2

(12) United States Patent
Flemming et al.

(10) Patent No.: US 9,459,922 B2
(45) Date of Patent: *Oct. 4, 2016

(54) ASSIGNING A FIRST PORTION OF PHYSICAL COMPUTING RESOURCES TO A FIRST LOGICAL PARTITION AND A SECOND PORTION OF THE PHYSICAL COMPUTING RESOURCES TO A SECOND LOGICAL PORTION

(71) Applicant: International Business Machines Corporation, Armonk, NY (US)

(72) Inventors: Diane G. Flemming, Pflugerville, TX (US); Octavian F. Herescu, Austin, TX (US); William A. Maron, Austin, TX (US); Mysore S. Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,147

(22) Filed: Sep. 15, 2015

(65) Prior Publication Data

US 2016/0019095 A1 Jan. 21, 2016

Related U.S. Application Data

(63) Continuation of application No. 12/582,813, filed on Oct. 21, 2009, now Pat. No. 9,135,079.

(51) Int. Cl.
*G06F 9/46* (2006.01)
*G06F 9/50* (2006.01)
(Continued)

(52) U.S. Cl.
CPC ........ *G06F 9/5011* (2013.01); *G06F 9/45516* (2013.01); *G06F 9/45558* (2013.01);
(Continued)

(58) Field of Classification Search
None
See application file for complete search history.

(56) References Cited

U.S. PATENT DOCUMENTS 7,007,276 B1   2/2006   Kubala et al.
7,222,150 B1   5/2007   Phillips et al.
(Continued)

FOREIGN PATENT DOCUMENTS

EP   2065804 A1    3/2009
JP   2008090546 A   4/2008
JP   2009205696 A   9/2009

OTHER PUBLICATIONS

Hiroyasu Araki, Examination of Adaptive CPA Scheduler for Dynamic Change of Processor Core Resources, Technical Report of Information Processing Society of Japan, Jpan, Information Processing Society of Japan, Jan. 30, 2008, vol. 2008, No. 9, p. 119-125.

(Continued)

*Primary Examiner* — Wissam Rashid
(74) *Attorney, Agent, or Firm* — Thomas E. Tyson; Gregory K. Goshorn; Greg Goshorn, P.C.

(57) ABSTRACT

A data processing system includes physical computing resources that include a plurality of processors. The plurality of processors include a first processor having a first processor type and a second processor having a second processor type that is different than the first processor type. The data processing system also includes a resource manager to assign portions of the physical computing resources to be used when executing logical partitions. The resource manager is configured to assign a first portion of the physical computing resources to a logical partition, to determine characteristics of the logical partition, the characteristics including a memory footprint characteristic, to assign a second portion of the physical computing resources based on the characteristics of the logical partition, and to dispatch the logical partition to execute using the second portion of the physical computing resources.

20 Claims, 6 Drawing Sheets

(51) Int. Cl.
*G06F 9/455* (2006.01)
*G06F 9/48* (2006.01)

(52) U.S. Cl.
CPC .......... *G06F 9/4881* (2013.01); *G06F 9/5088* (2013.01); *G06F 2009/4557* (2013.01); *G06F 2009/45579* (2013.01)

(56) References Cited

U.S. PATENT DOCUMENTS

| | | | |
|---|---|---|---|
| 7,406,407 | B2 | 7/2008 | Larus |
| 7,444,459 | B2 | 10/2008 | Johnson |
| 7,681,054 | B2 | 3/2010 | Ghiasi et al. |
| 7,844,709 | B2 | 11/2010 | Aman et al. |
| 9,135,079 | B2 | 9/2015 | Flemming et al. |
| 9,135,080 | B2 | 9/2015 | Flemming et al. |
| 2005/0013705 | A1 | 1/2005 | Farkas et al. |
| 2006/0047911 | A1 | 3/2006 | Mewhinney et al. |
| 2006/0168571 | A1 | 7/2006 | Ghiasi et al. |
| 2007/0067606 | A1 | 3/2007 | Lin et al. |
| 2008/0022282 | A1 | 1/2008 | Cherkasova et al. |
| 2008/0244213 | A1* | 10/2008 | Flemming ............ G06F 9/5077 711/173 |
| 2008/0244568 | A1 | 10/2008 | Flemming et al. |
| 2008/0294881 | A1 | 11/2008 | Chen et al. |

OTHER PUBLICATIONS

VMware, "VMware VMotion and CPU Compatibility," VMware—Information Guide, XP-002568512, retrieved from the internet: http://www.vmware.com/files/pdf/vmotion_info_guide.pdf [retrieved Feb. 12, 2010], 14 pages.

Ihausner, 'VMotion Between Apples and Oranges—Understanding CPE Compatibility Constraints for VMware VMotion', XP-002568514, retrieved from the Internet: http://download3.vmware.com/wmworld/2006, Nov. 2006, 34 pages.

* cited by examiner

ASSIGNING A FIRST PORTION OF PHYSICAL COMPUTING RESOURCES TO A FIRST LOGICAL PARTITION AND A SECOND PORTION OF THE PHYSICAL COMPUTING RESOURCES TO A SECOND LOGICAL PORTION

CROSS-REFERENCES TO RELATED APPLICATIONS

The present application is a continuation and claims the benefit of the filing date of an application entitled, "Assigning a Portion or Physical Computing Resources to a Logical Partition" Ser. No. 12/582,813, filed Oct. 21, 2009, now U.S. Pat. No. 9,135,079, issued Sep. 15, 2015, assigned to the assignee of the present application, and herein incorporated by reference.

FIELD OF DISCLOSURE

The present disclosure is generally related to assigning a portion of physical computing resources to a logical partition.

BACKGROUND OF THE INVENTION

Logical partitioning of physical computing resources may allow for the creation of multiple system images. Each system image, known also as a virtual machine (VM), may operate in a logically independent manner from the other VMs while using shared resources of the physical computing environment. Each logical partition corresponding to a VM may be independently reset, loaded with an operating system that may be different than operating systems of the other partitions, and operate with different software programs using different input/output (I/O) devices.

The physical computing resources may include specialized hardware resources to perform specific functions. Current operating systems may not be able to take advantage of these specialized hardware resources. Attempting to rewrite operating systems to take advantage of specialized hardware resources may be difficult and time consuming.

SUMMARY

In a particular embodiment, a computer implemented method includes determining first characteristics of a first logical partition, where the first characteristics include a memory footprint characteristic. The computer implemented method includes assigning a first portion of a first set of physical computing resources to the first logical partition. The first set of physical computing resources includes a plurality of processors. The plurality of processors include a first processor having a first processor type and a second processor having a second processor type different than the first processor type. The first portion of the first set of physical computing resources includes the second processor. The computer implemented method also includes dispatching the first logical partition to execute using the first portion of the first set of physical computing resources. The computer implemented method further includes creating as second ond logical partition. The computer implemented method also includes assigning a second portion of the first set of physical computing resources to the second logical partition. The second portion of the first set of physical computing resources includes the second processor. The computer implemented method further includes dispatching the second logical partition to execute using the second portion of the first set of physical computing resources.

In another particular embodiment, a computer program product includes a computer readable storage medium having, computer readable program code embodied therewith. The computer readable program code is executable by a processor to assign a first portion of physical computing resources to a first logical partition. The physical computing resources include processing resources that include as first processor having a general purpose processor type and a second processor having a scientific processor type. The first portion of the physical computing resources includes the second processor. The computer readable program code is further executable by the processor to assign a second portion of the physical computing resources to a second logical partition, where the second portion of the physical computing resources includes the second processor. The computer readable program code is further executable by the processor to dispatch the first logical partition to execute using the first portion of the physical computing resources. The computer readable program code is further executable by the processor to dispatch the second logical partition to execute using the second portion of the physical computing resources. The computer readable program code is further executable by the processor to determine first characteristics of the first logical partition, where the first characteristics include a memory footprint characteristic and a cycle per instruction characteristic. The computer readable program code is further executable by the processor to assign a third portion of the physical computing resources to the first logical partition based on the first characteristics of the first logical partition, where the third portion of the physical computing resources does not include the second processor.

In another particular embodiment, a data processing system includes physical computing resources that include a plurality of processors. The plurality of processors include a first processor having a first processor type and a second processor having a second processor type that is different than the first processor type. The data processing system also includes a resource manager to assign portions of the physical computing resources to be used when executing logical partitions. The resource manager is configured to assign a first portion of the physical computing resources to a logical partition, to determine characteristics of the logical partition, the characteristics including a memory footprint characteristic, to assign a second portion of the physical computing resources based on the characteristics of the logical partition, and to dispatch the logical partition to execute using the second portion of the physical computing resources.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
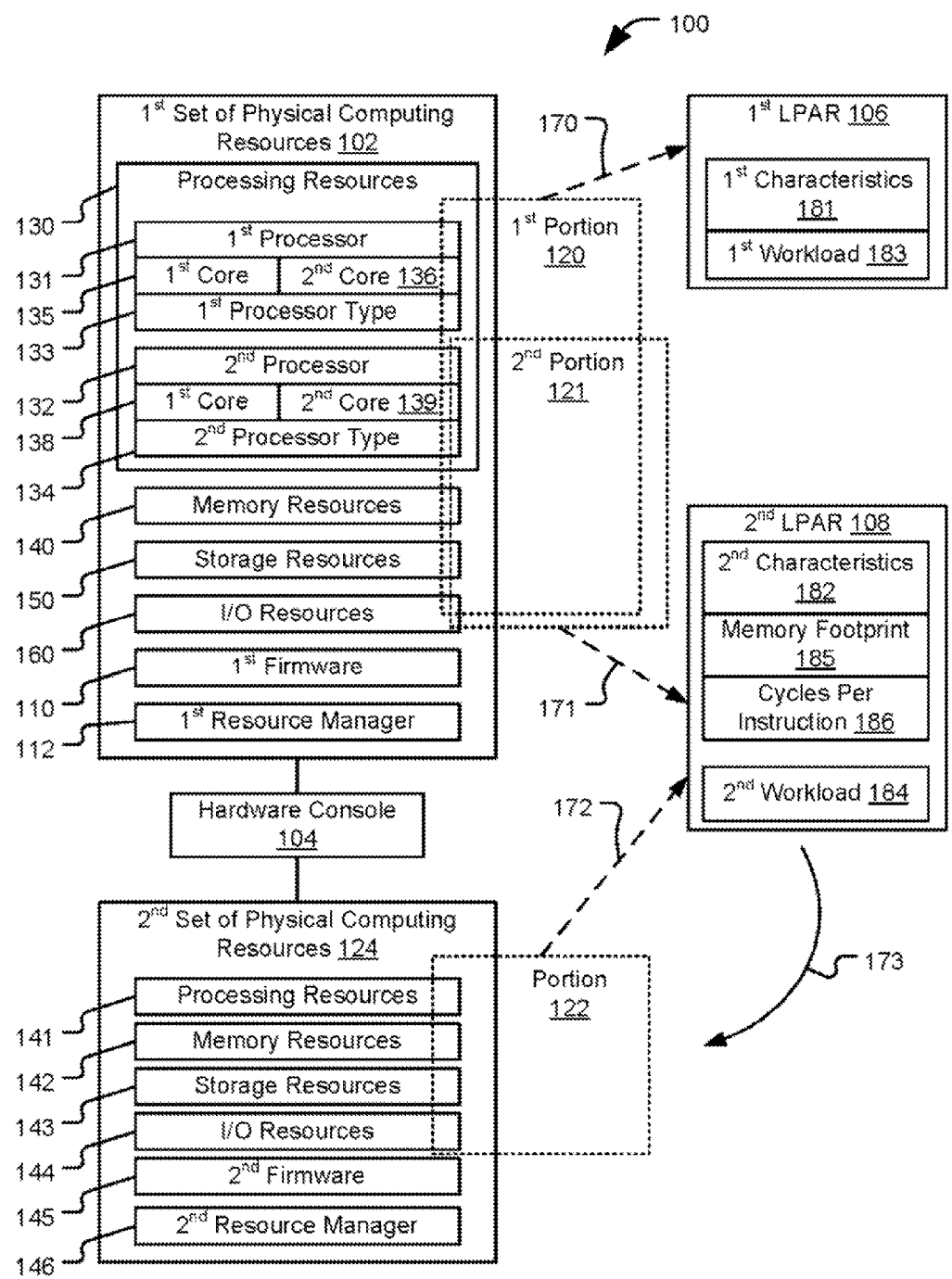
FIG. 1 is a block diagram of a first particular embodiment of a system to assign a portion of physical computing resources to a logical partition.

FIG. 1 is a block diagram of a first particular embodiment of a system 100 to assign a portion of physical computing resources to a logical partition. The system 100 includes a first set of physical computing resources 102, a second set of physical computing resources 124, a hardware console 104, a first Logical PARtition (LPAR) 106, and a second logical partition 108.

The first set of physical computing resources 102 include processing resources 130, memory resources 140, storage resources 150. Input/Output (I/O) resources 160, first firmware 110, and a first resource manager 112. The processing resources 130 include a first processor 131 and a second processor 132. The first processor 131 is a multi-core processor that includes at least a first core 135 and a second core 136. The first processor 131 has a first processor type 133. The second processor 132 is a multi-core processor that includes a first core 138 and a second core 139. The second processor 132 has a second processor type 134. Each of the processor types 133-134 may be a general purpose processor type, a scientific processor type, a cryptographic processor type, another processing type, or any combination thereof. In a particular embodiment, the first processor type 133 is a general purpose processor type and the second processor type 134 is a scientific processor type. For example, the second processor 132 may be a specialized processor having additional floating point registers (not shown) for performing scientific calculations. The first set of physical computing resources 102 may be housed in a first physical frame (not shown) and may be referred to as a Central Electronics Complex (CEC), processing node, or server. The second set of physical computing resources 124 may be housed in a second physical frame (not shown) that is different from the first physical frame. The first set of physical computing resources 102 may be in a location different from the second set of physical computing resources 124.

The memory resources 140 may include Random Access Memory (RAM), such as Dynamic RAM (DRAM) or Static RAM (SRAM). The storage resources 150 may include storage drives, such as disk drives. The I/O resources 160 may include interfaces to input and output data, such as a Universal Serial Bus (USB) interface, a Firewire interface, and an Ethernet interface. The first firmware 110 may include firmware associated with the first set of physical computing resources 102.

The first resource manager 112 may execute just above the level of the first firmware 110. The first resource manager 112 may be called a hypervisor. The first resource manager 112 may use the first firmware 110 to determine the resources in the first set of physical computing resources 102 and to monitor and manage the first set of physical computing resources 102 via the first firmware 110. For example, the first resource manager 112 may use the first firmware 110 to determine that the second processor 132 has the cores 138-139 and is a special purpose processor, such as a scientific processor. The first resource manager 112 may use the first firmware 110 to monitor the utilization of the first set of physical computing resources 102 by the logical partitions 106 and 108. The first resource manager 112 may use the first firmware 110 to instruct unused portions of the first set of physical computing resources 102 to power down. The first resource manager 112 may use the first firmware 110 monitor the utilization of the first set of physical computing resources 102 by the logical partitions 106 and 108 to determine first characteristics 181 of the first logical partition 106 and second characteristics 182 of the second logical partition 108. Based on the characteristics 181-182, the first resource manager 112 may assign portions of the first set of physical computing resources 102 to the logical partitions 106 and 108.

The hardware console 104 may be a specialized computing device capable of instructing the first resource manager 112 to create the logical partitions 106 and 108. For example, a system administrator (not shown) may use the hardware console 104 to instruct the first resource manager 112 to create the logical partitions 106 and 108 and to assign portions of the first set of physical computing resources 102 to the logical partitions 106 and 108.

The second set of physical resources 124 include processing resources 141, memory resources 142, storage resources 143, I/O resources 144, second firmware 145, and a second resource manager 146. The processing resources 141 may include one or more processors having different processor types. For example, the processing resources 141 may include a general purpose processor type, a cryptographic processor type, a scientific processor type, another processor type, or any combination thereof. The memory resources 142 may include various types of memory, such as Random Access Memory (RAM). The storage resources 143 may include storage drives, such as disk drives. The I/O resources 144 may include interfaces to input and output data, such as a Universal Serial Bus (USB) interface, a Firewire interface, and an Ethernet interface.

The second resource manager 146 may use the second firmware 145 to identify the particular resources of the second set of physical resources 124. The second resource manager 146 may use the second firmware 145 to monitor utilization of the second set of physical resources 124 by logical partitions dispatched for execution at the second set of physical resources 124.

The logical partition 106 may be a system image (e.g. a virtual machine) that operates in a logically independent manner from the logical partition 108, while sharing use of the first set of physical computing resources 102 with the logical partition 108. The logical partitions 106 and 108 may each have one or more workloads, such as the workloads 183 and 184. For example, the workloads 183 and 184 may be software processes that are capable of being executed at a logical partition. The first logical partition 106 has first characteristics 181 that represent characteristics of workloads that are associated with the first logical partition 106. The second logical partition 108 has second characteristics 182 that represent characteristics of workloads that are associated with the second logical partition 108. For example, the first characteristics 181 may indicate that the first logical partition 106 has characteristics of a scientific workload. The second characteristics 182 may indicate that the second logical partition 108 has characteristics of a cryptographic workload.

In operation, the hardware console 104 may be used to instruct the first resource manager 112 to create the first logical partition 106 and the second logical partition 108. The hardware console 104 may be used to assign 170 a first portion 120 of the first set of physical computing resources to the first logical partition 106 and to assign 171 a second portion 121 of the first set of physical computing resources 102 to the second logical partition 108. The portions 120-121 are depicted as including at least a portion of the second processor 132, the memory resources 140, the storage resources 150, and the I/O resources 160. The first portion 120 is depicted as including at least a portion of the first processor 131 while the second portion 121 is depicted as not including any portion of the first processor 131. For example, the portions 120-121 of the first set of physical computing resources 102 may include at least a portion of the second processor 132. To illustrate, the first portion 120 of the first set of physical computing resources 102 may include access to the first core 138 of the second processor 132 and the second portion 121 of the first set of physical computing resources 102 may include access to the second core 139 of the second processor 132. Thus, when the logical partitions 106 and 108 both have scientific workloads and the second processor 132 has a scientific processor type, the portions 120-121 may include a portion of the second processor 132.

The first resource manager 112 may dispatch the first logical partition 106 to execute using the first portion 120 of the first set of physical computing resources 102. The first resource manager 112 may monitor how the first logical partition 106 utilizes the first portion 120 of the first set of physical computing resources 102 and determine first characteristics 181. The first resource manager 112 may dispatch the second logical partition 108 to execute using the second portion 121 of the first set of physical computing resources 102. The first resource manager 112 may monitor how the second logical partition 108 utilizes the second portion 121 of the first set of physical computing resources 102 and determine second characteristics 182. The first resource manager 112 may determine the workload characteristics 181-182 via the first firmware 110.

When a particular logical partition is dispatched to execute, the particular logical partition may require time and resources to repopulate a state of as processor and a state of a memory associated with the particular logical partition before the particular logical partition can begin executing. The time and the resources used to repopulate the state of the processor and the state of the memory associated with the particular logical partition is called a memory footprint characteristic and may be included in the workload characteristics 181-182. In addition, the workload characteristics 181 and 182 may include one or more of a cycles per instruction characteristic, a FLoating point OPerations (FLOPs) completed characteristic, an instructions completed characteristic, a bandwidth utilization characteristic, a cache misses characteristic, a cache line count characteristic, a cache affinity characteristic, other workload characteristics, or any combination thereof.

The first resource manager 112 may determine the second characteristics 182 that include a memory footprint 185 characteristic and a cycles per instruction 186 characteristic. The first resource manager 112 may assign 172 a portion 122 of the second set of physical computing resources 124 to the second logical partition 108 and alter a dispatch target of the second logical partition 108 from the first set of physical computing resources 102 to the second set of physical computing resources 124, illustrated as a dispatch 173. When the first set of physical computing resources 102 and the second set of physical computing resources 124 are separate CECs, dispatching the second logical partition 108 from the first set of physical computing resources 102 to the second set of physical computing resources 124 may be referred to as migration. For example, the first set of physical computing resources 102 may not include a cryptographic processor while the second set of physical resources 124 may include a cryptographic processor. The first resource manager 112 may assign 172 the portion 122 of the second set of physical computing resources 124 to the second logical partition 108 after determining that the second characteristics 182 indicate that the second workload 184 performs cryptographic calculations.

By assigning 172 the portion 122 of the second set of physical computing resources 124 to the second logical partition 108 and migrating 173 the second logical partition 108 from the first set of physical computing resource 102 to the second set of physical computing resources 124, the second logical partition 108 can run more efficiently when the second set of physical computing resources 124 include resources that are more suited for executing the second logical partition 108.

Figure 2:
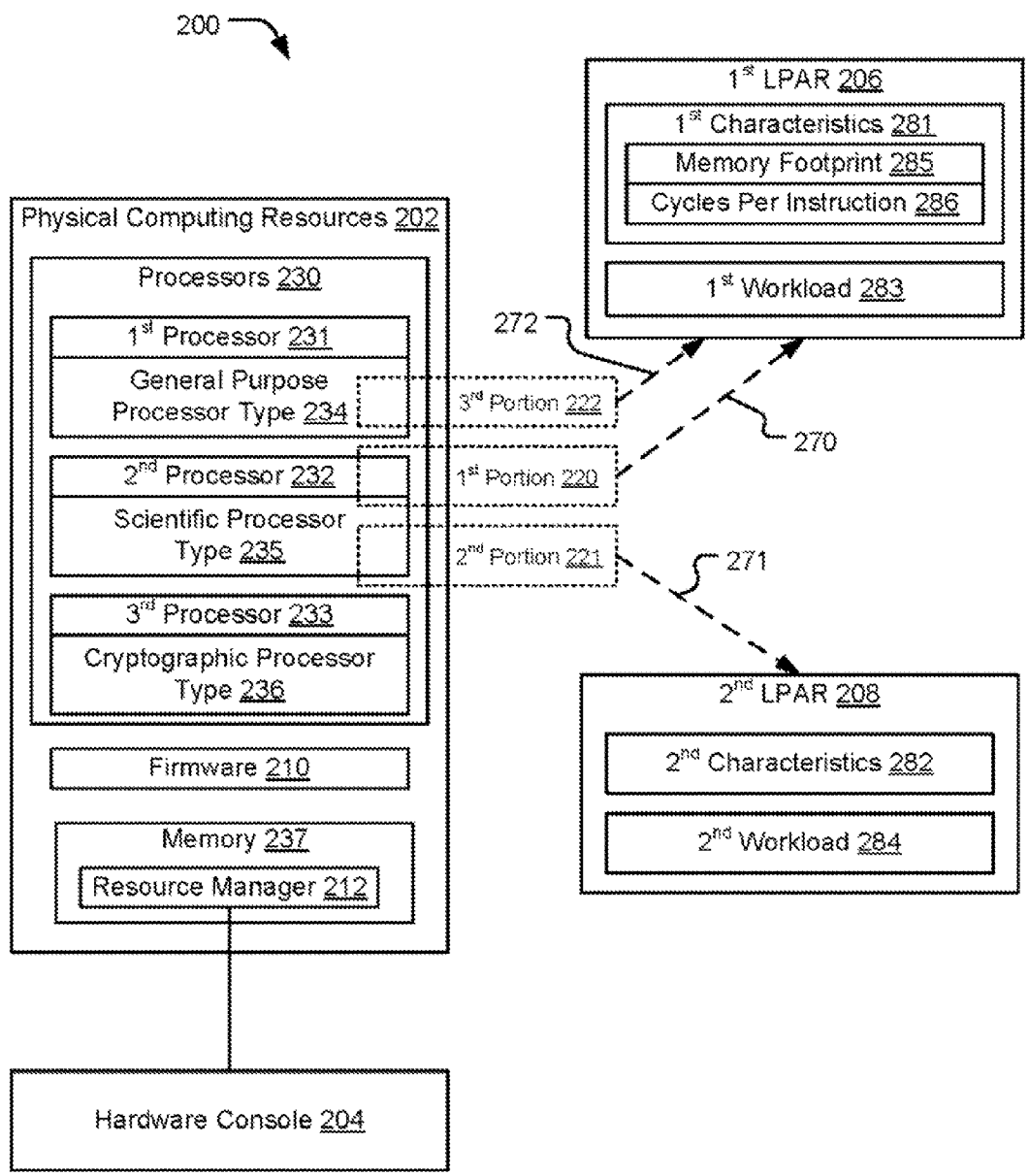
FIG. 2 is a block diagram of a second particular embodiment of a system to assign a portion of physical computing resources to a logical partition.

FIG. 2 is a block diagram of a second particular embodiment of a system 200 to assign a portion of physical computing resources to a logical partition. The system 200 includes physical computing resources 202, a hardware console 204, a first logical partition 206, and a second logical partition 208.

The physical computing resources 202 include processors 230, firmware 210, and memory 237. The memory 237 includes a resource manager 212, which may also be known as a hypervisor. The processors 230 may include a first processor 231, a second processor 232, and a third processor 233. In FIG. 2, the first processor 231 has a general purpose processor type 234, the second processor 232 has a scientific processor type 235, and the third processor 233 has a cryptographic processor type 236. The scientific processor type 235 may have additional floating point registers (not shown) compared to the general purpose processor type 234 to enable the second processor 232 to process scientific workloads more efficiently. The cryptographic processor type 236 may include a cryptographic-quality random number generator, Advanced Encryption Standard (AES) processing capabilities, Data Encryption Standard (DES) processing, capabilities, Triple Data Encryption Standard (TDES) processing capabilities, Secure flash Algorithm (SHA) processing capabilities, other cryptographic processing capabilities, or any combination thereof.

The logical partitions 206 and 208 may be virtual computing environments that execute a particular operating system and use a portion of the physical computing resources 202. The logical partitions 206 and 208 may execute one or more workloads (e.g. processes). In FIG. 2, the first logical partition 296 has a first workload 283 and the second logical partition 208 has a second workload 284. The logical partitions 206 and 208 may be dispatched for execution during a predetermined time interval and may utilize a portion of the physical computing resources 202 when they are dispatched. More than one logical partition may be dispatched during a given time interval. In a particular embodiment, the time interval may be approximately ten milliseconds.

The hardware console 204 may be used by a system administrator (not shown) to instruct the resource manager 212 to create the logical partitions 286 and 208. The hardware console 204 may be used by the system administrator to instruct the resource manager 212 to assign portions of the physical computing resources 202 to the logical partitions 206 and 208 for use when the logical partitions 206 and 208 execute.

The resource manager 212 may execute at a level just above the firmware 210. The resource manager 212 may include instructions executable by one or more of the processors 231-233 to perform various functions. For example, the resource manager 212 may identify, monitor, and manage the physical computing resources 202, as described with respect to the resource manager 112 of FIG. 1.

In operation, the resource manager 212 may assign 270 a first portion 220 of the physical computing resources 202 to the first logical partition 206. The first portion 220 of the physical computing resources 202 may include at least a portion of the second processor 232. The resource manager 212 may assign 271 a second portion 221 of the physical computing resources 202 to the second logical partition 208. The second portion 221 of the physical computing resources 202 may include at least a portion of the second processor 232. The resource manager 242 may dispatch the first logical partition 206 to execute using the first portion 220 of the physical computing resources 202. The resource manager 212 may dispatch the second logical partition 208 to execute using the second portion 221 of the physical computing resources 202. The resource manager 212 may determine first characteristics 281 of the first logical partition 206, such as a memory footprint characteristic 285 and a cycle per instruction characteristic 286.

The resource manager 212 may determine that the first workload 283 is a scientific workload based on the first characteristics 281. The resource manager 212 may determine the second characteristics 282 and determine that the second workload 284 is a scientific workload based on the second characteristics 282. Thus, the logical partitions 206 and 208 may both be dispatched to execute using a portion of the second processor 232 having the scientific processor type 235.

The resource manager 212 may assign 272 a third portion 222, in place of the first portion 220, of the physical computing resources 202 to the first logical partition 206 based on the first characteristics 281 of the first logical partition 206. The third portion 222 of the physical computing resources 202 may include first processor 231 but may not include any portion of the second processor 232. To illustrate, one characteristic of a scientific workload is that a scientific workload may tend to not stop executing at a processor before an execution time slice of the workload is completed. Further, a scientific workload may be computationally intensive and may not block Input/Output (I/O) requests because the calculations are usually executed at the processor itself. Thus, in some cases, a scientific workload may execute faster on to logical partition that is associated with a dedicated general purpose processor type rather than a shared scientific processor type. In FIG. 2, the first workload 283 may execute faster using the third portion 222 of the physical computing resources 202 because the first workload 283 no longer has to contend with the second workload 284.

Thus, the resource manager 212 can determine the first characteristics 281 of the first logical partition 206 and change the portion of the physical computing resources 202 assigned to the first logical partition 206 from the first portion 220 to the third portion 222. By changing the portion of the physical computing resources 202 assigned to the first logical partition 206, the first workload 283 of the first logical partition 206 may execute Faster using the third portion 222 that includes the general purpose processor type 234 but does not include the scientific processor type 235.

Figure 3:
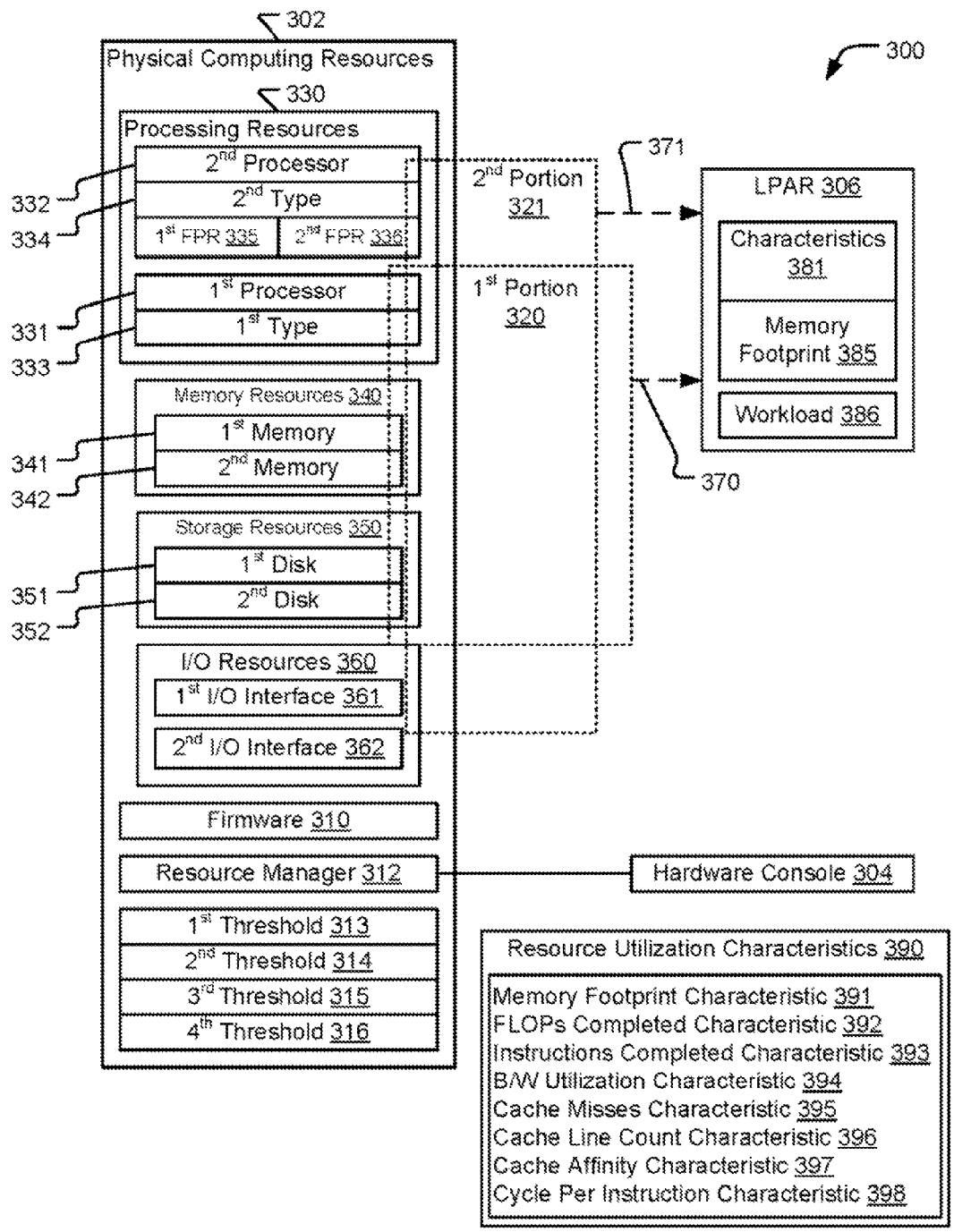
FIG. 3 is a block diagram of a third particular embodiment of a system to assign a portion of physical computing resources to a logical partition.

FIG. 3 is a block diagram of a third particular embodiment of a system 300 to assign a portion of physical computing resources to a logical partition. The system 300 includes physical computing resources 302, a hardware console 304, and a logical partition 306.

The physical computing resources 302 include processing resources 330, memory resources 349, storage resources 350, Input/Output (I/O) resources 360, firmware 310, a resource manager 312, a first threshold 313, a second threshold 314, a third threshold 315, and a fourth threshold 316. The processing resources 330 include a first processor 331 and a second processor 332. The first processor 331 has a first type 333 and the second processor 332 has a second type 334. For example, the first type 333 may be a general purpose processor type and the second type 334 may be a scientific processor type that is different from the first type 333. In a particular embodiment, the second type 334 of the second processor 332 may be a cryptographic processor type. The second processor 332 has at least a first Floating Point Register (FPR) 335 and a second FPR 336. The memory resources 340 include a first Memory 341 and a second memory 342. The storage resources 350 include a first disk 351 and a second disk 352, The I/O resources 369 include a first I/O interface 361 and a second I/O interface 362. The firmware 310 may enable the resource manager 312 to monitor utilization of the physical computing resources 302 by the logical partition 306 when the logical partition 306 is dispatched for execution.

The hardware console 304 may be used to instruct the resource manager 312 to create the logical partition 306. The hardware console 304 may be used to instruct the resource manager 312 to assign a portion of the physical computing resources 302 to the first logical partition 306. The first logical partition 306 may use the assigned portion of the physical computing resources 302 when the first logical partition 306 is dispatched by the resource manager 312 for execution.

In operation, the resource manager 312 may assign 370 a first portion 320 of the physical computing resources 302 to the logical partition 306. The first portion 320 may include a portion of the first processor 331 but not include any portion of the second processor 332. For example, a system administrator (not shown) may use the hardware console 304 to instruct the resource manager 312 to assign 370 the first portion 320 of the physical computing resources 302 to the logical partition 306. The resource manager 312 may determine characteristics 381 of a workload 386 executing at the first logical partition 306. The workload 386 may be an instance of a process. The characteristics 381 may include one or more resource utilization characteristics 390. The resource utilization characteristics 390 may include a memory footprint characteristic 391, a Floating point OPerations (FLOPs) completed characteristic 392, an instructions completed characteristic 393, a bandwidth utilization characteristic 394, a cache misses characteristic 395, a cache line count characteristic 396, a cache affinity characteristic 397, a cycles per instruction characteristic 398, other workload characteristics, or any combination thereof.

The resource manager 312 may determine that the characteristics 381 indicate that the workload 386 is a scientific workload. The firmware 310 may provide the resource manager 312 with details of the physical computing resources 392. For example, the firmware 310 may provide the resource manager 312 with information identifying the first processor 331 as a general purpose processor type and identifying the second processor 332 as a scientific processor type.

The resource manager 312 may assign 371 a second portion 321 of the physical computing resources 302 to the logical partition 306 based on the characteristics 381. The second portion 321 of the physical computing resources 302 may replace the first portion 320 of the physical computing resources 302 that the logical partition 306 may use when dispatched for execution. The resource manager 312 may assign 371 the second portion 321 of the physical resources 302 to the logical partition 306 because the second portion 321 of the physical computing resources 302 includes the second processor 332. The resource manager 312 may dispatch the logical partition 306 to execute with the second portion 321 of the physical computing resources 302. The floating point registers 335-336 of the second processor 332 may enable the workload 386 to execute faster after the logical partition 306 is dispatched to execute using the second portion 321 of the physical computing resources 302.

The resource manager 312 may use the thresholds 313-316 to determine which portion of the physical computing resources 302 to assign to the logical partition 306. For example, the resource manager 312 may assign 371 the second portion 321 of the physical computing resources 302 to the logical partition 306 in response to determining that a ratio of the FLOPs completed characteristic 392 to the instructions completed characteristic 393 is greater than or equal to the first threshold 313. For example, the resource manager 312 may assign 371 the second portion 321 of the physical computing resources 302 to the logical partition 306 in response to determining that a ratio of the FLOPs completed characteristic 392 as compared to the instructions completed characteristic 393 is greater than or equal to 0.70. To illustrate, when seventy percent or more of the instructions being completed by the logical partition 306 are floating point operations, the resource manager 312 may determine that the workload 386 is a scientific workload and assign 371 the second portion 321 that includes the second processor 332 when the second processor 332 is a scientific processor type.

In another example, the resource manager 312 may assign 371 the second portion 321 of the physical computing resources 302 to the logical partition 306 in response to determining that a ratio of the FLOPs completed characteristic 392 as compared to the instructions completed characteristic 393 is less than the second threshold 314 and that the bandwidth utilization characteristic 394 is greater than the third threshold 315. For example, the resource manager 312 may assign 371 the second portion 321 of the physical computing resources 302 to the logical partition 306 in response to determining that the ratio of the FLOPs completed characteristic 392 to the instructions completed characteristic 393 is less than 0.70 and that the bandwidth utilization characteristic 394 is greater than 0.40. To illustrate, when less than seventy percent of the instructions being completed by the logical partition 306 are floating point operations and the logical partition 306 has a relatively high bandwidth utilization, the resource manager 312 may determine that the workload 386 is a scientific workload and assign 371 the second portion 321 that includes the second processor 332 when the second processor 332 is a scientific processor type.

In yet another example, the resource manager 312 may assign 370 the first portion 320 of the physical computing resources 302 to the logical partition 306 in response to determining that the ratio of the FLOPs completed characteristic 392 as compared to the instructions completed characteristic 393 is less than the fourth threshold 316. For example, the resource manager 312 may assign 370 the first portion 320 of the physical computing resources 302 to the logical partition 306 in response to determining that the ratio of the FLOPs completed characteristic 392 to the instructions completed characteristic 393 is less than 0.40. To illustrate, when less than forty percent of the instructions being completed by the logical partition 306 are floating point operations, the resource manager 312 may determine that the workload 386 is not a scientific workload and assign 370 the first portion 320 that includes the first processor 331 but not the second processor 332 when the first processor 331 is a general purpose processor type.

Thus, the resource manager 312 can determine the characteristics 381 of the logical partition 306 and assign 371 the second portion 321 of the physical computing resources 302 based on the characteristics 381. For example, the resource manager 312 may determine the characteristics 381, calculate various statistics based on the characteristics 381, and compare the various statistics to the thresholds 313-316 to determine whether to change a currently assigned portion of the physical computing resources 302. By assigning a different portion of the physical computing resources 302, the resource manager 312 may enable the workload 386 to execute more efficiently because the second portion 321 of the physical computing resources 302 may be more closely suited to the workload 386. The thresholds 313-316 may be modifiable to enable a system administrator to fine tune the system 300.

Figure 4:
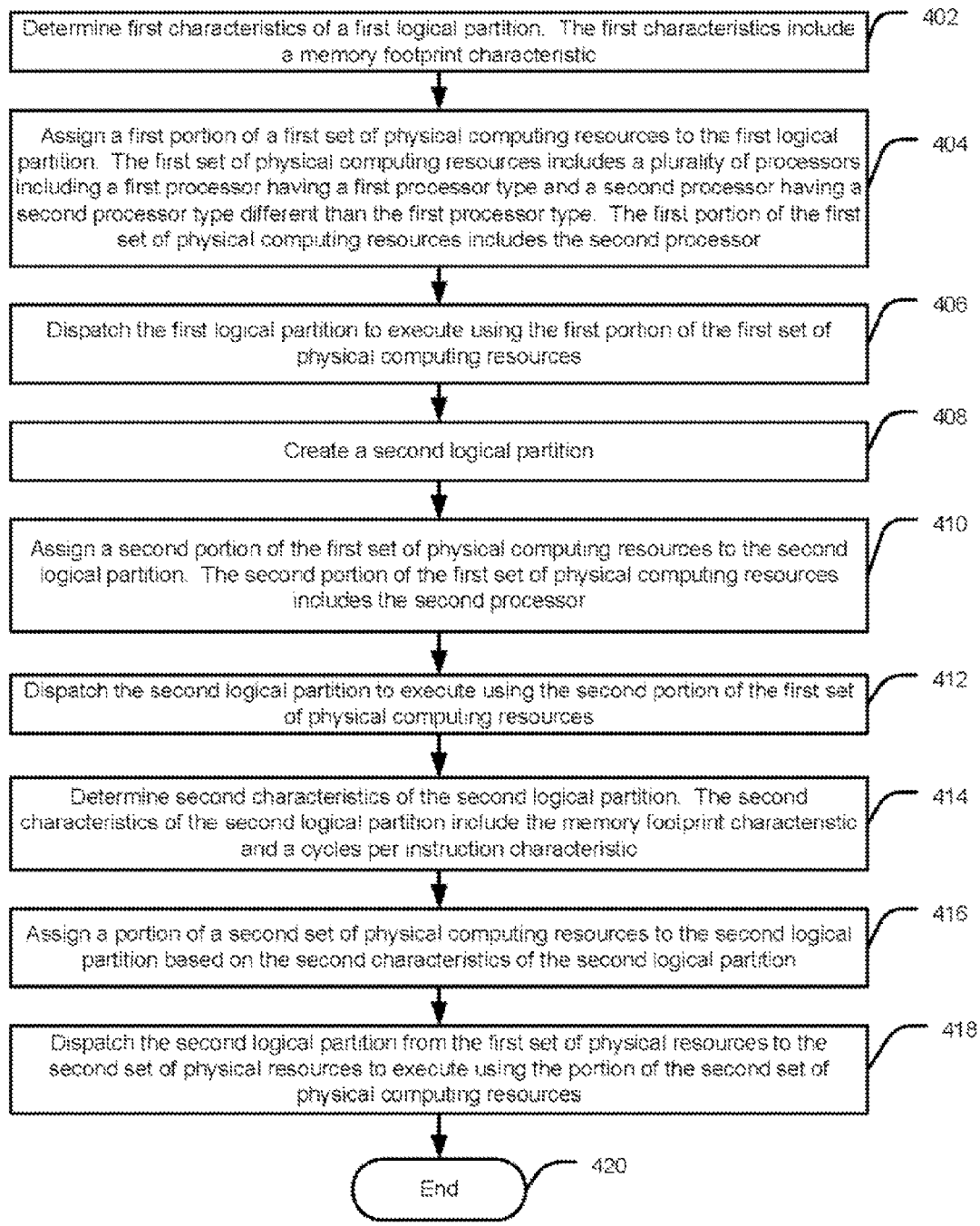
FIG. 4 is a flow diagram of a first illustrative embodiment of a method to assign a portion of physical computing resources to a logical partition.

FIG. 4 is a flow diagram of a first illustrative embodiment of a method to assign a portion of physical computing resources to a logical partition. For example, the method may be performed by the resource manager 112 of FIG. 1, the resource manager 212 of FIG. 2, or the resource manager 312 of FIG. 3.

First characteristics of a first logical partition are determined, at 402. The first characteristics include a memory footprint characteristic. Moving to 404, a first portion of a first set of physical computing resources is assigned to the first logical partition. For example, the first characteristics of the first logical partition may be collected during an initial run time and the first portion of the first set of physical computing resources may be assigned to the first logical partition in a subsequent run time. The first set of physical computing resources includes a plurality of processors including a first processor having a first processor type and a second processor having a second processor type different than the first processor type. The first portion of the first set of physical computing resources includes the second processor. For example, the first portion of the first set of physical computing resources may be the first portion 120 of the first set of physical computing resources 102 of FIG. 1. Advancing to 406, the first logical partition is dispatched to execute using the first portion of the first set of physical computing resources.

Proceeding to 408, a second logical partition may be created. Continuing to 410, a second portion of the first set of physical computing resources may be assigned to the second logical partition. The second portion of the first set of physical computing resources may include the second processor. Moving to 412, the second logical partition may be dispatched to execute using the second portion of the first set of physical computing resources. For example, in FIG. 1, the first resource manager 112 may create the logical partitions 106 and 108 and assign the portions 120-121 of the first set of computing resources to the logical partitions 106 and 108. The first resource manager 112 may dispatch the logical partitions 106 and 108 to execute using the first portion 120 and the second portion 121 of the first set of physical computing resources.

Advancing to 414, second characteristics of the second logical partition may be determined. The second characteristics of the second logical partition may include the memory footprint characteristic and a cycles per instruction characteristic. Proceeding to 416, a portion of a second set of physical computing resources may be assigned to the second logical partition based on the second characteristics of the second logical partition. Continuing to 418, the second logical partition may be dispatched from the first set of physical resources to the second set of physical resources to execute using the portion of the second set of physical computing resources. For example, in FIG. 1, the first resource manager 112 may determine the second characteristics 182 and migrate the second logical partition 108 from the first set of physical computing resources 102 to the second set of physical computing resources 124 by altering a dispatch target of the second logical partition 108 to the second set of physical computing resources 124. The method ends, at 420.

Thus, by determining characteristics of a logical partition, a workload manager, such as the workload manager 112 of FIG. 1, can alter a dispatch target of the logical partition from a first set of physical computing resources to a second set of physical computing resources that more closely match the characteristics of the logical partition.

Figure 5:
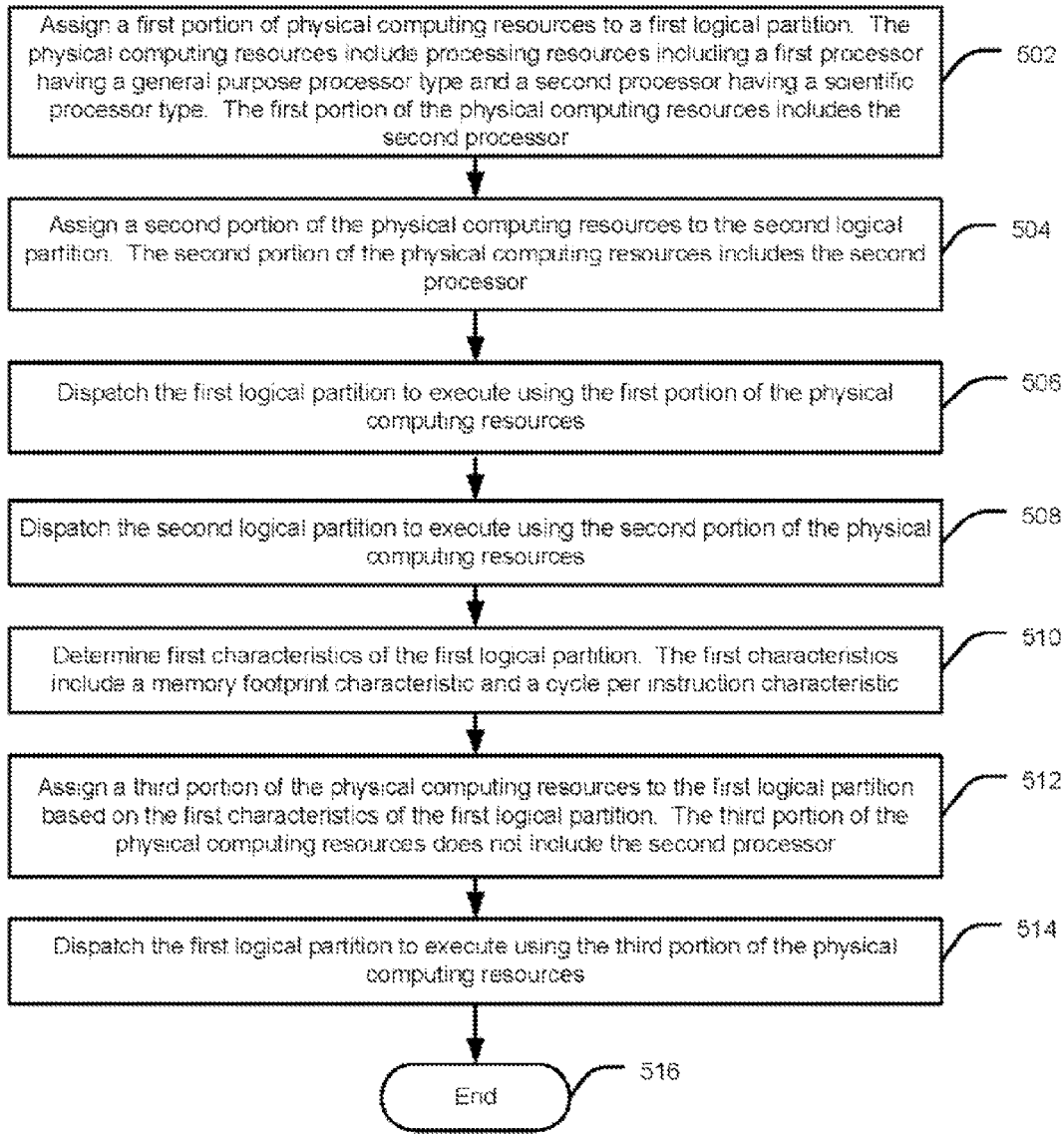
FIG. 5 is a flow diagram of a second illustrative embodiment of a method to assign a portion of physical computing resources to a logical partition.

FIG. 5 is a flow diagram of a second illustrative embodiment of a method to assign a portion of physical computing resources to a logical partition. For example, the method may be performed by the resource manager 112 of FIG. 1, the resource manager 212 of FIG. 2, or the resource manager 312 of FIG. 3.

A first portion of physical computing resources are assigned to a first logical partition, at 502. The physical computing resources include processing resources including a first processor having a general purpose processor type and a second processor having a scientific processor type. The first portion of the physical computing resources may include the second processor. Moving to 504, a second portion of the physical computing resources is assigned to the second logical partition. The second portion of the physical computing resources may include the second processor. Advancing to 506, the first logical partition is dispatched to execute using the first portion of the physical computing resources. Proceeding to 508, the second logical partition may be dispatched to execute using the second portion of the physical computing resources. Advancing to 510, first characteristics of the first logical partition may be determined. The first characteristics may include a memory footprint characteristic and a cycle per instruction characteristic.

Continuing to 512, a third portion of the physical computing resources may be assigned to the first logical partition based on the first characteristics of the first logical partition. The third portion of the physical computing resources may not include the second processor. Advancing to 514, the first logical partition may be dispatched to execute using the third portion of the physical computing resources. The method ends at 516.

Thus, by determining characteristics of a logical partition, a workload manager can assign a different portion of physical computing resources to the logical partition so that the assigned portion of the physical computing resources more closely match the characteristics of the logical partition.

Figure 6:
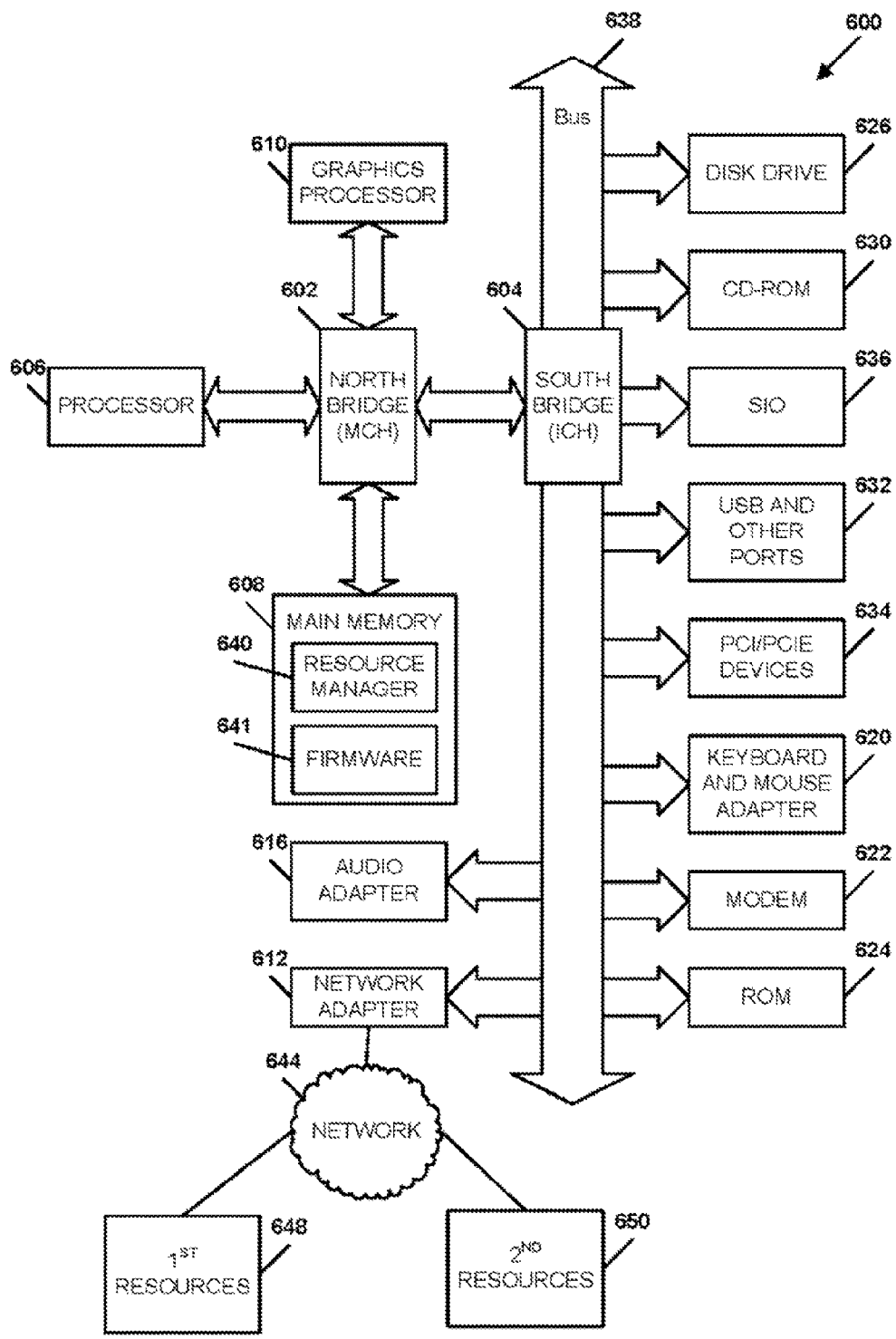
FIG. 6 is a general diagram of a computing system.

FIG. 6 is a block diagram of a computing system in which systems and methods of the present disclosure may be implemented. Computing system 600 includes an example of the resource managers 112 and 146 of FIG. 1, the resource manager 212 of FIG. 2, and the resource manager 312 of FIG. 3.

In the depicted example, the computing system 600 employs a hub architecture including a north bridge and memory controller hub (MCH) 602 and a south bridge and input/output (I/O) controller hub (ICH) 604. A processor 606, a main memory 608, and a graphics processor 610 are coupled to the MCH 602. For example, the graphics processor 610 may be coupled to the MCH 602 through an accelerated graphics port (AGP) (not shown).

In the depicted example, a network adapter 612 is coupled to the ICH 604 and an audio adapter 616, a keyboard and mouse adapter 620, a modem 622, a read only memory (ROM) 624, universal serial bus (USB) ports and other communications ports 632, and Peripheral Component Interconnect (PCI) and Peripheral Component Interconnect Express (PCIe) devices 634 are coupled to the ICH 604 via bus 638. A disk drive 626 and a CD-ROM drive 630 are coupled to the ICH 604 through the bus 638. The PCI/PCIe devices 634 may include, for example, Ethernet adapters, add-in cards, and PC cards for notebook computers. The ROM 624 may be, for example, a flash binary input/output system (BIOS). The disk drive 626 and the CD-ROM drive 630 may use, for example, an integrated drive electronics (IDE) or serial advanced technology attachment (SATA) interface. A super I/O (SIO) device 636 may be coupled to the ICH 604.

A network 644 is coupled to first resources 648 and second resources 650. For example, the network 644 may be a Local Area Network (LAN), a Wide Area Network (WAN), a wireless network, or any combination thereof. The resources 648 and 650 may include physical resources, such as one or more of the physical computing resources 102 and 124 of FIG. 1, the physical computing resources 202 of FIG. 2, and the physical computing resources 302 of FIG. 3. The main memory 608 includes a resource manager 640. The resource manager 640 may implement one or more of the functions of the resource manager 112 of FIG. 1, the resource manager 212 of FIG. 2, and the resource manager 312 of FIG. 3, The resource manager 640 may identify, monitor, and manage first resources 648 and second resources 650 via firmware 641. The firmware 641 may implement one or more of the functions of the firmware 110 and 145 of FIG. 1, the firmware 210 of FIG. 2, and the firmware 310 of FIG. 3.

An operating system (not shown) runs on the processor 606 and coordinates and provides control of various components within the computing system 600. The operating system may be a commercially available operating system such as Microsoft® Windows® XP (Microsoft and Windows are trademarks of Microsoft Corporation in the United States, other countries, or both). An object oriented programming system, such as the Java® programming system, may run in conjunction with the operating system and provide calls to the operating system from Java programs or applications executing on computing system 600 (Java and all Java-based trademarks are trademarks of Sun Microsystems, Inc. in the United States, other countries, or both).

Instructions for the operating system, the object-oriented programming system, and applications or programs are located on storage devices, such as the disk drive 626, and may be loaded into the main memory 608 for execution by the processor 606. The processes of the disclosed illustrative embodiments may be performed by the processor 606 using computer implemented instructions, which may be located in a memory such as, for example, the main memory 608, the read only memory 624, or in one or more of the peripheral devices.

The hardware in computing system 600 may vary depending on the implementation. Other internal hardware or peripheral devices, such as flash memory, equivalent non-volatile memory, or optical disk drives and the like, may be used in addition to or in place of the hardware depicted in FIG. 6. Also, the processes of the disclosed illustrative embodiments may be applied to a multiprocessor data processing system.

In some illustrative examples, portions of the computing system 600 may be implemented in a personal digital assistant (PDA), which is generally configured with flash memory to provide non-volatile memory for storing operating system files and/or user-generated data. A bus system may be comprised of one or more buses, such as a system bus, an I/O bus and a PCI bus. The bus system may be implemented using any type of communications fabric or architecture that provides for as transfer of data between different components or devices attached to the fabric or architecture. A communications unit may include one or more devices used to transmit and receive data, such as the modem 622 or the network adapter 612. A memory may be, for example, the main memory 608 or a cache such as found in the MCH 602. A processing unit may include one or more processors or CPUs. The depicted examples in FIG. 6 and above-described examples are not meant to imply architectural limitations. For example, portions of the computing system 600 also may be implemented in as tablet computer, laptop computer, or telephone device in addition to taking the form of a PDA.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers.

Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural Corms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or wore computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireline, optical fiber cable, RF, etc. or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer for example, through the Internet using an Internet Service Provider).

Aspects of the present invention are described herein with reference to flowchart illustrations and/or block diagrams of methods, apparatus (e.g. systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIG. 1-6 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams a and/or flowchart illustration, can be implemented by special purpose hardware-based systems that perform the specified functions or acts, or combinations of special purpose hardware and computer instructions.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

We claim:

1. A computer implemented method, comprising:
   determining first characteristics of a first logical partition;
   assigning a first portion of a first set of physical computing resources to the first logical partition based on the first characteristics, wherein the first set of physical computing resources includes a plurality of processors comprising a first processor and a second processor, and wherein the first portion of the first set of physical computing resources includes the second processor;
   dispatching the first logical partition to execute using the first portion of the first set of physical computing resources;
   creating a second logical partition;
   assigning a second portion of the first set of physical computing resources to the second logical partition, the second portion of the first set of physical computing resources including the second processor; and
   dispatching the second logical partition to execute using the second portion of the first set of physical computing resources;
   determining second characteristics of the second logical partition;
   assigning a portion of a second set of physical computing resources to the second logical partition based on the second characteristics of the second logical partition; and
   dispatching the second logical partition from the first set of physical computing resources to the second set of physical resources to execute using the portion of the second set of physical computing resources.

2. The computer implemented method of claim 1, wherein the first characteristics comprise a memory footprint characteristic of the first logical partition and the second characteristics comprise a memory footprint characteristic of the second logical partition.

3. The computer implemented method of claim 2, wherein the first footprint characteristic is one or more of a list, the list consisting of:
   a first length of time;
   a first amount of resources used to repopulate a first state of the first processor;
   a second length of time; and
   a second amount of resources used to repopulate a second state of a memory resource of the first portion of the first set of physical computing resources.

4. The computer implemented method of claim 1, wherein the assigning the portion of the second set of physical computing resources to the second logical partition based on the second characteristics of the second logical partition further comprising altering a dispatch target of the second logical partition from the first set of physical computing resources to the second set of physical computing resources.

5. The computer implemented method of claim 1, wherein the first portion of the first set of physical computing resources includes the first processor.

6. The computer implemented method of claim 1, wherein the second portion of the first set of physical computing resources excludes the first processor.

7. The computer implemented method of claim 1, wherein the first characteristics further comprise a floating point operations completed characteristic, an instructions completed characteristic, a hardware utilization characteristic, a cache misses characteristic, a cache line count characteristic, a cache affinity characteristic, a cycle per instruction characteristic, or a combination thereof.

8. The computer implemented method of claim 1, wherein the second characteristics of the second logical partition includes a cycles per instruction characteristic of the second logical partition.

9. An apparatus, comprising:
a plurality of processors,
a non-transitory computer-readable storage medium coupled to the plurality of processors; and
logic, stored on the computer-readable storage medium and executed on the plurality of processors, for:
determining first characteristics of a first logical partition;
assigning a first portion of a first set of physical computing resources to the first logical partition based on the first characteristics, wherein the first set of physical computing resources includes a plurality of processors comprising a first processor and a second processor, and wherein the first portion of the first set of physical computing resources includes the second processor;
dispatching the first logical partition to execute using the first portion of the first set of physical computing resources;
creating a second logical partition;
assigning a second portion of the first set of physical computing resources to the second logical partition, the second portion of the first set of physical computing resources including the second processor; and
dispatching the second logical partition to execute using the second portion of the first set of physical computing resources;
determining second characteristics of the second logical partition;
assigning a portion of a second set of physical computing resources to the second logical partition based on the second characteristics of the second logical partition; and
dispatching the second logical partition from the first set of physical computing resources to the second set of physical resources to execute using the portion of the second set of physical computing resources.

10. The apparatus of claim 9, wherein the first characteristics comprise a memory footprint characteristic of the first logical partition and the second characteristics comprise a memory footprint characteristic of the second logical partition.

11. The apparatus of claim 9, wherein the assigning the portion of the second set of physical computing resources to the second logical partition based on the second characteristics of the second logical partition further comprising altering a dispatch target of the second logical partition from the first set of physical computing resources to the second set of physical computing resources.

12. The apparatus of claim 9, wherein the first portion of the first set of physical computing resources includes the first processor.

13. The apparatus of claim 9, wherein the second portion of the first set of physical computing resources excludes the first processor.

14. The apparatus of claim 9, wherein the first characteristics further comprise a floating point operations completed characteristic, an instructions completed characteristic, a hardware utilization characteristic, a cache misses characteristic, a cache line count characteristic, a cache affinity characteristic, a cycle per instruction characteristic, or a combination thereof.

15. A computer programming product for the dispatching of computing resources to logical partitions, comprising a non-transitory computer-readable storage medium having program code embodied therewith, the program code executable by a plurality of processors to perform a method comprising:
determining first characteristics of a first logical partition;
assigning a first portion of a first set of physical computing resources to the first logical partition based on the first characteristics, wherein the first set of physical computing resources includes a plurality of processors comprising a first processor and a second processor, and wherein the first portion of the first set of physical computing resources includes the second processor;
dispatching the first logical partition to execute using the first portion of the first set of physical computing resources;
creating a second logical partition;
assigning a second portion of the first set of physical computing resources to the second logical partition, the second portion of the first set of physical computing resources including the second processor; and
dispatching the second logical partition to execute using the second portion of the first set of physical computing resources;
determining second characteristics of the second logical partition;
assigning a portion of a second set of physical computing resources to the second logical partition based on the second characteristics of the second logical partition; and
dispatching the second logical partition from the first set of physical computing resources to the second set of physical resources to execute using the portion of the second set of physical computing resources.

16. The computer programming product of claim 15, wherein the first characteristics comprise a memory footprint characteristic of the first logical partition and the second characteristics comprise a memory footprint characteristic of the second logical partition.

17. The computer programming product of claim 15, wherein the assigning the portion of the second set of physical computing resources to the second logical partition based on the second characteristics of the second logical partition further comprising altering a dispatch target of the second logical partition from the first set of physical computing resources to the second set of physical computing resources.

18. The computer programming product of claim 15, wherein the first portion of the first set of physical computing resources includes the first processor.

19. The computer programming product of claim 15, wherein the second portion of the first set of physical computing resources excludes the first processor.

20. The computer programming product of claim 15, wherein the first characteristics further comprise a floating point operations completed characteristic, an instructions completed characteristic, a hardware utilization characteristic, a cache misses characteristic, a cache line count characteristic, a cache affinity characteristic, a cycle per instruction characteristic, or a combination thereof.

* * * * *